April 24, 1945. C. A. HALL 2,374,540
PROCESS OF MAKING STORAGE BATTERY RETAINERS
Original Filed Oct. 13, 1939
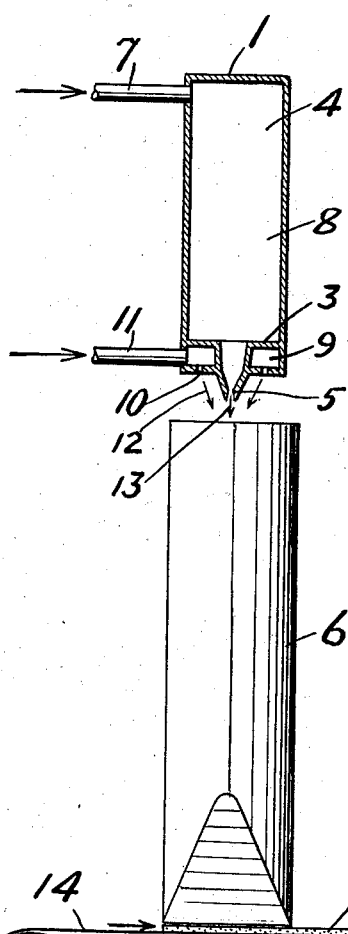
FIG. 1.
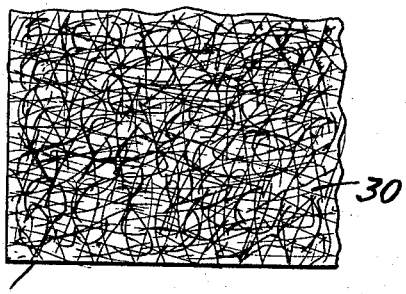
FIG. 2.
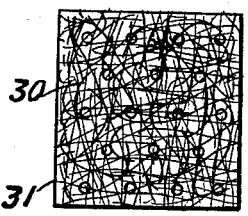
FIG. 3.
FIG. 4.
WITNESS:
INVENTOR
Clarence A. Hall
BY Augustus B. Stoughton
ATTORNEY.

Patented Apr. 24, 1945

2,374,540

UNITED STATES PATENT OFFICE 2,374,540

PROCESS OF MAKING STORAGE BATTERY RETAINERS

Clarence A. Hall, Philadelphia, Pa., assignor to The Electric Storage Battery Company, Philadelphia, Pa., a corporation of New Jersey Original application October 13, 1939, Serial No. 299,285. Divided and this application July 24, 1940, Serial No. 347,207

6 Claims. (Cl. 18—47.5)

This application is a division of my co-pending application Serial No. 299,285 filed October 13, 1939 now Patent No. 2,335,759.

The function of a retainer in a storage battery is largely to retain the active material of the positive plate to prevent it from coming into contact with the wood separator or from falling to the bottom of the cell.

The advantages of vinyl resin are: that the contiguous filaments can be made to attach to each other by the application of light pressure and a comparatively low temperature, thus producing a unitary structure which is self-supporting and can be handled for the purpose of assembly without introducing brittleness. This result is obtained without the use of an adhesive. Brittleness is avoided because the filaments of vinyl resin are remarkably flexible and thus provide sufficient flexibility between closely spaced points of attachment to permit the filaments to bend or give without breaking at their points of attachment.

Another advantage of vinyl resin is that the threads or filaments in a state of molecular saturation are resistant to and elastic in the powerful oxidizing environment prevailing at the surface of the plates of a storage battery, particularly the positive plate.

Another feature of my invention is that the retainer may be made with a smooth edge formed by causing the filaments at the edge to adhere to each other and preventing them from loosening and projecting beyond the margins of the retainers in service where they may catch any active material dislodged from the plates and cause short-circuits between the edges of opposite polarity.

An object of my invention is to provide a novel process of making such storage battery retainers. This process consists in forming a jet of a solution of vinyl resin, converging jets of compressed air on the jet of vinyl resin solution, thereby breaking up the liquid into very fine filaments and causing the solvent to evaporate, conducting the filaments by gravity or otherwise for a sufficient distance to cause them to become solid threads, receiving the solid threads into a heterogeneously disposed mat on a traveling conveyor, and subjecting the mat to the application of light pressure and a comparatively low heat, thereby causing the contiguous filaments to adhere to each other.

The process is described hereafter specifically as an example of my invention. No limiting interpretation is intended.

In the drawing:

Fig. 1 is a diagrammatic view, principally in side elevation with parts in vertical cross-section, of a suitable apparatus for carrying out my invention.

Fig. 2 is a diagrammatic face or plan view of a portion of a retainer of my invention.

Fig. 3 is a diagrammatic view in side elevation of a modified form of roll.

Fig. 4 is a diagrammatic face or plan view, on a reduced scale, of a modified form of retainer.

Vinyl resins are a well known class of synthetic resins which may be defined as solid thermoplastic saturated synthetic resins resulting from the polymerization of compounds of the vinyl group, $CH_2=CH$. Examples of vinyl resins are "Vinylite" and "Lucite" and "Polystyrene."

Referring to Fig. 1, I is a container which may be cylindrical and is divided by a partition 3 into upper and lower chambers 8 and 9, respectively. The upper chamber contains a solution of the vinyl resin indicated at 4 and terminates below in a nozzle 5, from which the solution is ejected in a fine stream into the top of the cylindrical chute 6. The upper chamber 8 is provided near the top with a pipe 7 through which compressed air may be supplied to force the solution out through the nozzle 5. The base of the lower chamber 9 is perforated with a series of holes or ducts 10 arranged in a circle around the nozzle 5 and directed at a slight angle from the vertical. A pipe 11 is provided at one side of the chamber 9 through which compressed air may be supplied, whereby jets of compressed air 12 are forced through the openings 10 and converge on the jet of liquid 13 coming out of the orifice 5. These jets of compressed air break up the stream of liquid into very fine filaments and cause the solvent to evaporate so that, by the time these filaments reach the bottom of the chute 6, they have become solid threads. The chute 6, which may be cylindrical above, is provided with a rectangular orifice at the bottom confronting the traveling conveyor 14 of fine wire mesh which is caused to travel in the direction of the arrow around the drums 15 and 16 by means of any suitable mechanism (not shown). Beneath the traveling conveyor 14 and immediately confronting the lower opening of the chute 6 is an exhaust chamber 17 provided within an exhaust pipe 18, by means of which the entrained filaments of vinyl resin in the chute 6 are caused to loosely pack into a mat 19 on the conveyor 14 which, after leaving the conveyor, is carried between the two heated rolls 20 and 21, whereby pressure and elevated temperature are applied to the mat, compacting this into a coherent and self-supporting strip 22, which may be rolled on the drum 23 and thereafter cut into suitable sizes for storage battery retainers and the like.

As an example of the solution introduced into the container 1, a 15% solution of "Lucite" in toluene plus 10% methyl alcohol has been found satisfactory. The function of the methyl alcohol is to reduce the viscosity of the 15% "Lucite" solution thereby making the solution more suitable for processing in the manner already described. A pressure of about one pound per square inch is applied through the pipe 7 to the upper surface of the solution, and compressed air under a pressure of seventy-five pounds per square inch is introduced through the pipe 11 into the chamber 9. The orifice 5 may have a diameter at its exit of 0.01 inch and the openings 10 may have a diameter of 0.04 inch and be directed at an angle of about 5° from the vertical. For the conveyor 14 a sixty mesh screen has been found satisfactory. The rolls 20 and 21 are heated to a temperature of about 250° F. It will be understood, of course, that these dimensions and other details may be varied to obtain the particular results and characteristics of the product that may be desired.

Fig. 2 shows a portion of the retainer 30 having a smooth edge 31.

Instead of applying a uniform pressure over the entire surface of the mat, this pressure may be applied to restricted areas distributed over the surface of the mat in a manner similar to spot welding. This is shown in Fig. 4 by modifying the design of the roll 20 as shown at 29 in Fig. 3.

It has also been found advantageous in obtaining the desired characteristics of the finished product to use a mixture of more than one of the known vinyl resins. As an example of this, to an approximately saturated solution of "Lucite" in toluene may be added a solution of "Polystyrene" in xylol, the proportion being such as to give a final product containing 90% of "Lucite" and 10% of "Polystyrene" after the solvent has been removed. The addition of the polystyrene to the mixture adds bulk to the mat without a proportionate increase in weight. In other words, the addition of polystyrene in solution to the methacrylate in solution seems to inhibit settling of the filaments produced and results in a thicker mat than is obtained from the methacrylate alone.

I do not intend to be limited save as the scope of the attached claims may require.

I claim:

1. A process of making a storage battery retainer comprising: forming and controlling by relatively low pressure a jet of a solution of vinyl resin, converging upon said jet a plurality of jets of compressed air controlled at comparatively higher pressure, thereby causing said jet of vinyl resin solution to break up into very fine filaments and causing the solvent to evaporate, felting said fine filaments into a mat consisting only of heterogeneously disposed vinyl resin filaments, and consolidating contiguous filaments of said mat at discrete points of restricted area by the simultaneous application of heat and pressure whereby mechanical strength is imparted to said mat.

2. A process of forming a storage battery retainer comprising: forming and controlling by relatively low pressure a jet of a solution of vinyl resin, converging upon said jet a plurality of jets of compressed air controlled at comparatively higher pressure, thereby breaking the jet of vinyl resin solution into very fine filaments and causing the solvent to evaporate; collecting said filaments in a mat of heterogeneously disposed filaments; and simultaneously applying to said mat pressure and heat, sufficient to consolidate contiguous filaments to produce a self-sustaining battery retainer having consolidated portions interconnected by flexible vinyl resin filament portions.

3. A process of forming a storage battery retainer comprising: forming under comparatively low pressure a jet of a solution of methacrylate resin in toluene plus methyl alcohol; breaking the jet of solution into very fine filaments by a plurality of jets of compressed air under comparatively high pressure and causing the solvent to evaporate; collecting said filaments in a felted mat of heterogeneously disposed filaments; and simultaneously applying to said felted mat pressure and heat, sufficient to consolidate contiguous filaments to produce a self-sustaining battery retainer having consolidated portions interconnected by flexible vinyl resin filament portions.

4. A process of forming a storage battery retainer comprising: forming under pressure a jet of a solution of methacrylate resin in toluene plus polystyrene in xylol; breaking the jet of solution into very fine filaments and causing the solvents to evaporate; collecting said filaments in a felted mat of heterogeneously disposed filaments; and simultaneously applying to said felted mat pressure and heat at spaced intervals, thereby causing the filaments to consolidate in each other at points spaced throughout the mat.

5. The process of making a storage battery retainer which comprises forming and controlling by pressure a jet of a solution of vinyl resin, simultaneously breaking said jet into fine streams and evaporating the solvent by converging thereupon a series of gaseous jets under separately controlled higher pressure to form fine filaments of solid vinyl resin, forming said filaments into a mat of heterogeneously disposed filaments, and simultaneously applying heat and pressure to said mat to cause said filaments to consolidate at spaced intervals to form a unitary self-supporting article of flexible filaments interconnected and consolidated at spaced points.

6. A process of making storage battery retainers comprising subjecting a mat, consisting only of fine, comparatively long, heterogeneously disposed filaments of vinyl resin, to the application simultaneously of pressure applied at predetermined points of restricted area and of heat sufficient to consolidate contiguous filaments in each other within such areas, leaving intermeshed but disconnected flexible filaments between said areas.

CLARENCE A. HALL.

CERTIFICATE OF CORRECTION.

Patent No. 2,374,540. April 24, 1945.

CLARENCE A. HALL.

It is hereby certified that error appears in the printed specification of the above numbered patent requiring correction as follows: Page 1, first column, line 3, for the patent number "2,335,759" read --2,335,757--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.